United States Patent [19]

Tavor

[11] 4,369,805

[45] Jan. 25, 1983

[54] LIQUID METERING INJECTOR ASSEMBLY

[75] Inventor: Chanany Tavor, Kibbutz Amiad, Israel

[73] Assignee: Amiad Mutzarei Yiul, Korazim, Israel

[21] Appl. No.: 225,033

[22] Filed: Jan. 12, 1981

Related U.S. Application Data

[63] Continuation of Ser. No. 67,232, Aug. 16, 1979, abandoned.

[30] Foreign Application Priority Data

Nov. 15, 1978 [IL] Israel .................................. 55953

[51] Int. Cl.³ ........................................... G05D 11/00
[52] U.S. Cl. .................................. 137/101.31; 222/57; 222/250; 137/99
[58] Field of Search .................. 92/13.6, 13.8, 60.5; 137/101.21, 101.31, 99, 625.63, 625.66, 625.69; 222/57, 249, 250

[56] References Cited

U.S. PATENT DOCUMENTS

| 3,216,627 | 11/1965 | Best et al. | 222/249 |
| 3,283,667 | 11/1966 | Andersen | 137/625.66 |
| 3,283,957 | 11/1966 | Henderson | 222/57 |
| 3,370,759 | 2/1968 | Johansson | 222/249 |
| 3,448,754 | 6/1969 | Crabtree | 222/57 |
| 3,497,105 | 2/1970 | DeGiorgi et al. | 222/249 |
| 3,642,171 | 2/1972 | Ernst | 222/57 |
| 3,968,971 | 7/1976 | Mariaulle | 137/625.69 |
| 4,007,755 | 2/1977 | Lerner et al. | 134/101.31 |
| 4,012,176 | 3/1977 | Drori | 222/57 |
| 4,111,607 | 9/1978 | Tavor | 417/46 |

FOREIGN PATENT DOCUMENTS 1371436  10/1974  United Kingdom ................ 93/60.5

Primary Examiner—H. Jay Spiegel
Attorney, Agent, or Firm—Browdy and Neimark

[57] ABSTRACT

A liquid metering injector assembly for injecting metered quantities of a first liquid into respective metered quantities of a second liquid comprising a metering cylinder, metering ports formed at either end of the metering cylinder; a metering piston displaceable in the metering cylinder; a valve unit having a valve inlet for coupling to a pressurized source of the first liquid; means for coupling the valve to a hydraulic pulse source; a valve outlet for coupling to a source of the second liquid; a pair of communication valve ports of said valve unit respectively communicating with the metering ports and selectively communicatable with the valve inlet and outlet and a displaceable spool valve of the valve unit responsive to the hydraulic pulses so as to be displaceable between two positions in which the respective communication of the valve unit communicating ports with the valve unit inlet and outlet are successively reversed.

11 Claims, 9 Drawing Figures

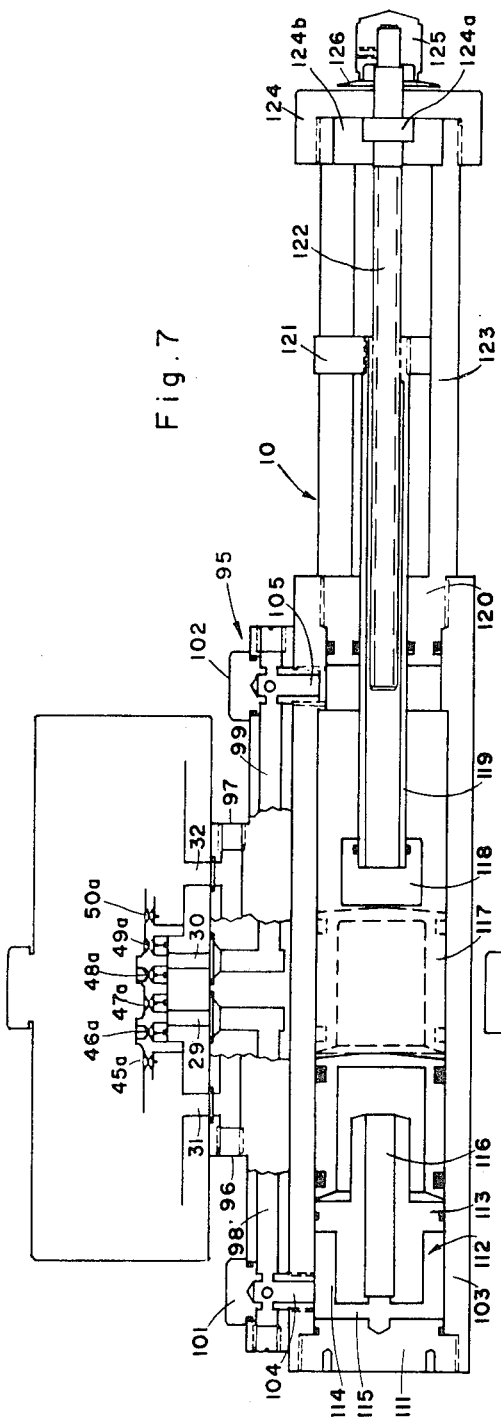
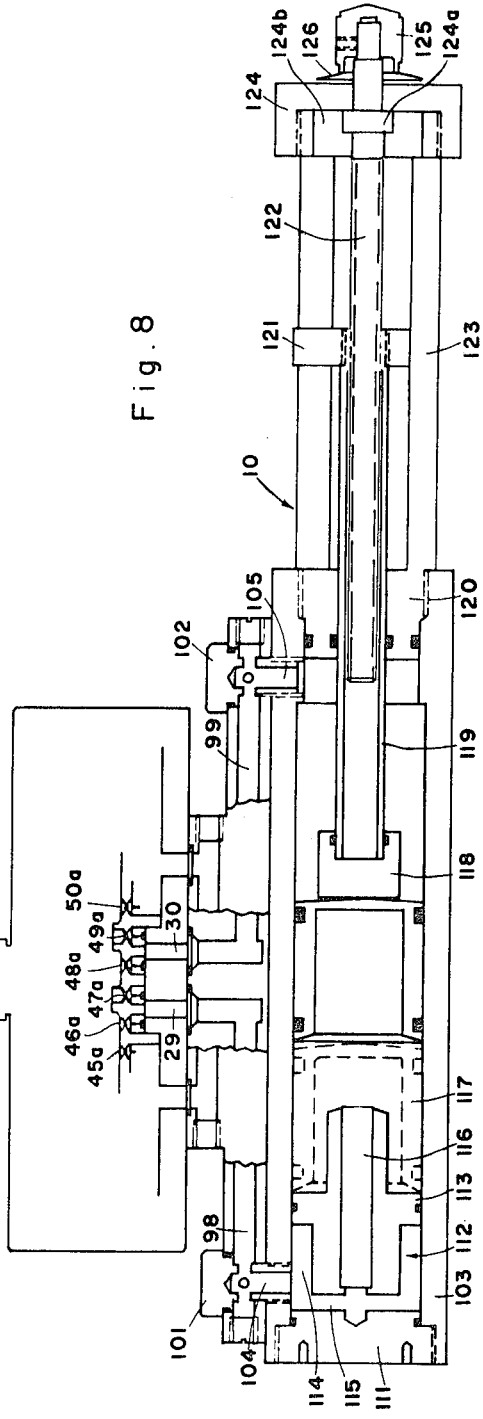

LIQUID METERING INJECTOR ASSEMBLY

This is a continuation of application Ser. No. 067,232 filed Aug. 16, 1979, now abandoned, now withdrawn in favor of the present case.

This invention relates to a liquid metering injector assembly. The function of such assembly is to inject a metered quantity of a first liquid into a second liquid. Where the second liquid is subject to flow conditions, e.g. water flowing in a supply pipe, it is clearly desired that the rate of injection of the metered quantities of the first liquid should be related to the flow conditions of the second liquid so as to ensure that the concentration of the first liquid in the second liquid is controlled.

For this purpose it is known to inject the first liquid (e.g. a fertilizer liquid) into an irrigation pipe in which flows the second liquid (water) using a hydraulically driven pump, it being possible to derive the power for driving the pump by tapping off a portion of the main water flow in the irrigation pipe. Such a pump is disclosed in our U.S. Pat. No. 4,111,607. In this case the pump pumps the liquid to be injected (fertilizer liquid) from a reservoir and injects it, in predetermined quantities, into the irrigation pipe.

However, and despite the fact that the rate of operation of the pump bears a direct relationship to the flow pressure in the pipe, and in consequence the rate of injection of the first liquid into the irrigation pipe is related to some of the flow conditions in the irrigation pipe, it is clear that flow rate variations can occur in the irrigation pipe to which the pump is not wholly responsive. As a consequence it has not been possible to achieve a rate of injection of the metered quantities of the first liquid which bears a direct relationship to the quantity of second liquid flowing through the pipe and therefore the concentration of the first liquid in the second liquid has not been constant.

This inconstancy of concentration leads to waste, inadequate treatment and can even be dangerous.

It is an object of the present invention to provide a liquid metering injector assembly which renders it possible to inject metered quantities of a first liquid into metered quantities of a second so that the relative concentration of the two liquids remains substantially constant.

According to the present invention there is provided a liquid metering injector assembly for injecting metered quantities of a first liquid into respective metered quantities of a second liquid comprising a metering cylinder, metering ports formed at either end of said metering cylinder; a metering piston displaceable in said metering cylinder; a valve unit having a valve inlet for coupling to a pressurized source of said first liquid; means for coupling the valve to a hydraulic pulse source; a valve outlet for coupling to a source of said second liquid; a pair of communication valve ports of said valve unit respectively communicating with said metering ports and selectively communicable with said valve inlet and outlet; and a displaceable spool valve assembly of said valve unit responsive to said hydraulic pulses so as to be displaceable between two positions in which the respective communication of said valve unit communicating ports with said valve unit inlet and outlet are successively reversed.

Where the second liquid is for example water flowing in a supply pipe the source of the hydraulic control pulses can be actuated by a water flow meter coupled to the pipe and so arranged that a hydraulic control pulse is transmitted to the valve unit every time a predetermined quantity of water has been metered by the flow meter. Seeing that the receipt of the control pulse results in a displacement of the spool valve assembly which results in injection of a metered quantity of the first liquid in the irrigation pipe it is ensured that the ratio of first to second liquids in the pipe is maintained substantially constant.

Preferably the metering unit is provided with means for varying, as required, the stroke of the metering piston thereby varying the quantity of first liquid metered by the assembly.

Clearly the injector assembly can be employed with any set of two liquids, the requirement being to ensure that the concentrations thereof remain constant.

Whilst the invention has been specifically described with reference to the injection of fertilizer liquid into irrigation water it is clearly applicable to the injection of other liquid substances into a water supply such as, for example, sterilising agents, medical additives, etc. The invention is equally applicable where the second liquid is other than water. For example liquid constituents which flow in chemical processes can be treated with a liquid additive using an assembly of the kind described.

Furthermore whilst we have described the use of a specific form of hydraulically driven pump for delivering the fertilizer liquid under pressure to the valve unit inlet it is clear that other forms of pressurised liquid sources can equally well be employed.

One embodiment of a liquid metering injector assembly in accordance with the present invention will now be described by way of example and with reference to the accompanying drawings in which:

FIGS. 7 and 8 are longitudinally sectioned views of a metering unit of the metering injector assembly in respectively differing dispositions.

Figure 1:
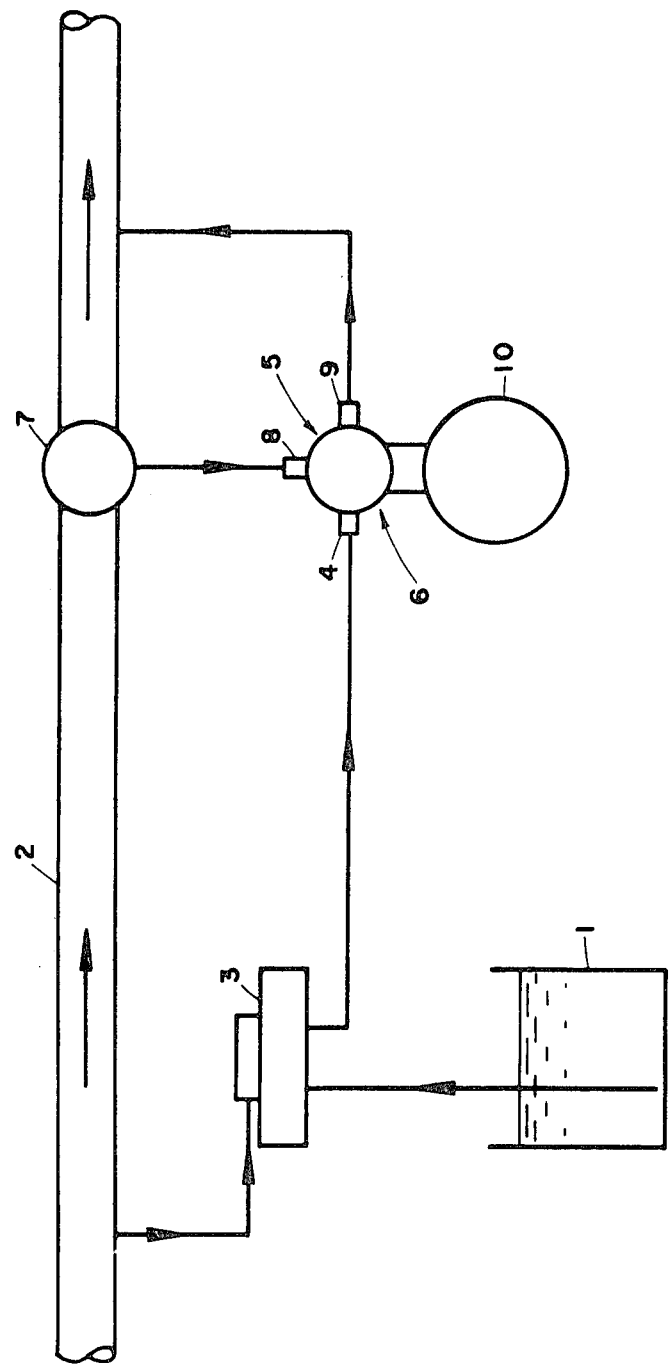
FIG. 1 is a schematic representation of a system incorporating a metering injector assembly in accordance with the present invention for injecting metered quantities of fertilizer liquid into metered quantities of irrigation liquid.

As seen in FIG. 1, there is here shown schematically a system for injecting a metered quantity of a fertilizer liquid, from a reservoir 1 into an irrigation pipe 2 whilst ensuring that the rate of injection of the metered quantities is directly related to the rate of flow of the irrigation liquid in the irrigation pipe 2. In this way the concentration of the fertilizer liquid in the irrigation liquid is maintained substantially constant and independent of variations in the flow rate of the irrigation liquid in the irrigation pipe 2.

The system incorporates a hydraulically driven pump 3 (for example of the kind forming the subject of U.S. Pat. No. 4,111,607) which pumps fertilizer liquid from the reservoir 1 and delivers it, under pressure to an inlet 4 of a valve unit 5 forming part of a metering injector assembly 6. A liquid flow meter 7 associated with the pipe 2 is coupled to a control inlet 8 of the valve unit 5 so as to transmit to the inlet 8 a hydraulic actuating pulse every time a predetermined quantity of irrigation liquid, flowing through the pipe 2, has been metered by the flow meter 7. A valve unit outlet 9 is coupled to a location in the pipe 2 downstream of the flow meter 7. The valve unit 5 controls the operation of its associated metering unit 10.

In operation the pump 3, which is hydraulically driven by a tapped-off portion of the irrigation liquid flowing through the pipe 2, pumps fertilizer liquid from the reservoir 1 and delivers it, under increased pressure, to the inlet 4 of the valve unit 5. Predetermined quantities of fertilizer liquid are metered by the metering unit 10 and are injected from the outlet 9 into the irrigation pipe 2 in accordance with the rate of receipt of hydraulic pulses from the flow meter 7. In this way it is ensured that the rate of injection of the predetermined quantities of fertilizer liquid is determined by the rate of flow of irrigation liquid in the pipe 2. In consequence the concentration of the fertilizer liquid in the irrigation water is maintained substantially constant.

Reference will now be made to FIGS. 2 through 9 of the drawings for a description of the construction of the valve unit 5.

As seen in the drawings the valve unit 5 is completely symmetrical about a central median plane and, in order to facilitate the description, identical parts on either side of this plane will be given the same reference numerals. Where necessary however, it will be possible to distinguish between two such parts by the letters L and R indicating respectively that we are dealing with left-hand and righthand located parts. The valve unit comprises an outer cylindrical casing 11 provided with a pair of screw fitted end caps 12 of identical construction (the drawing showing the end cap 12L rotated by 90° with respect to the end cap 12R).

Formed in an upper wall of the cylindrical casing 11 is a central inlet aperture 13 from which extends, in opposite directions a pair of longitudinally directed ducts 14 formed in the wall of the casing 11. The inlet pressure 13 has screw fitted therein a coupling bung 15. The bung 15 is formed with a central tapped bore 16 and has a downwardly depending threaded portion 17 which is apertured so as to allow the ducts 14 to communicate with the central bore 16. The threaded portion 17 is screwed into a correspondingly tapped aperture formed in a central, inwardly directed annular flange 18 of the casing wall.

Figure 6:
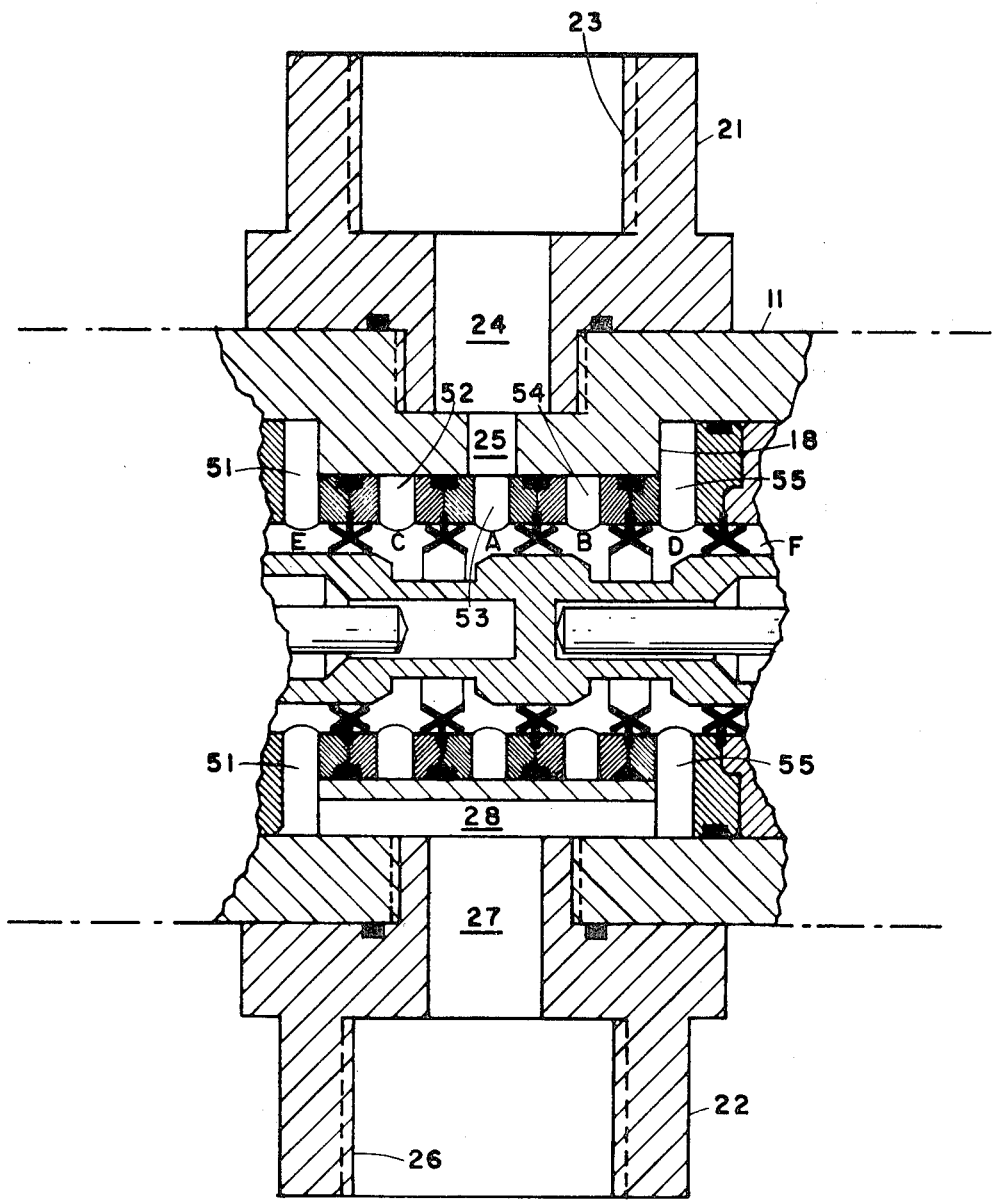
FIG. 6 is a longitudinally sectioned view of the valve unit shown in FIG. 2 taken along the line VI—VI with the valve unit in the stage of operation shown in FIG. 5.

As can be seen in FIG. 6 of the drawings, the casing 11 is formed with two additional, diametrically opposed, centrally located apertures which are respectively displaced by 90° with respect to the coupling bung 15 and which are respectively screw fitted with coupling bungs 21 and 22. The coupling bung 21 is formed with a central tapped bore 23 which communicates via a bore 24 with a duct 25 extending through the central flange 18. Similarly the bung 22 is formed with a central tapped bore 26 which communicates, via a central bore 27, with an axially directed duct 28 formed in the annular flange 18.

Also extending through the annular flange 18 and at position diametrically opposite to the bung 15 are a pair of throughgoing ducts 29 and 30, the casing being formed, on either side of the ducts 29 and 30 with a pair of throughgoing ports 31 and 32.

Fitted into either end of the cylindrical casing 11 are a pair of cylindrical inserts 33. Each insert 33 consists of an outer insert portion 33a, an inner insert portion 33b and an intermediate insert portion 33c. A peripheral groove 35 surrounds the intermediate insert portion 33c and communicates on the one hand with the port 31 and, on the other hand, via a duct 36 with the inner cylindrical region defined by the intermediate insert portion 33c and, via an additional duct 37, with the inner cylindrical region defined by the outer insert portion 33a.

An inner rim of the intermediate insert portion 33c constitutes abutment flange 38.

Located between the adjacent ends of the cylindrical inserts 33L and 33R are successive sets of annular insert components 45, 46, 47, 48, 49 and 50. Between the insert components 45 and 46 is duct 51; between the insert components 46 and 47 is duct 52; between the insert components 47 and 48 is duct 53; between the insert components 48 and 49 is duct 54; and between the insert components 49 and 50 is duct 55.

Between the insert component 45 and the adjacent insert portion 33L there is supported an annular flexible seal 45a. The insert components 46, 47, 48 and 49, respectively, support flexible annular seals 46a, 47a, 48a and 49a whilst between the insert component 50 and the adjacent end of the insert portion 33bR there is supported a flexible annular seal 50a.

As can be seen, the ducts 52 and 54 communicate respectively with the ducts 29 and 30 whilst, from FIG. 6 of the drawings, it can be seen that the duct 53 communicates with the duct 25 whilst the ducts 51 and 55 communicate with the axially directed duct 28.

The aligned cylindrical inserts 33L and 33R and the insert components 45–50, when located in the cylindrical casing 11 are held in position by the screwed in end caps 12L and 12R. Each end cap 12 comprises a recessed portion 61 having turning recesses 62 and a central boss portion 63 which merges with the main body portion of the end cap 12 via a shoulder 64. A central recessed cavity 65 is formed in the boss portion 63 having a bevelled rim portion 65a constituting a valve seat. There extends radially from the cavity 65 a first pair of ducts 66 whose outer ends communicate with a peripheral duct 66a which communicates with the longitudinally directed duct 14, there being provided sealing rings 66b and 66c on either side of the duct 66a. Axially spaced from the ducts 66 is a second pair of ducts 67 displaced by 90° with respect to the first pair of ducts 66. The ducts 67 communicate with an inner end face of the boss portion 63 via ducts 69. As can be seen the ducts 67 communicate with the cavity 65 via a peripheral groove 70 in which is located a displaceable sealing ring 71.

A spool valve 75 comprises a tubular spool sleeve 76 having outer portions 76a and 76b, an innermost portion 76c and adjacent portions 76d and 76e, a dividing partition wall 76f extending centrally through the central portion 76c. Formed in the walls of the outer portions 76a and 76b are throughgoing apertures 77. The outermost end of the end portion 76a is disposed adjacent the annular abutment 38L whilst the outermost end of the end portion 76b is disposed adjacent the annular abutment 38R.

The spool valve is furthermore provided with a pair of control pistons 81.

Each piston 81 comprises successive piston portions 82, 83 and 84 of steadily reducing diameter, the portion 83 merging with the portion 82 via a tapering shoulder portion 85 whilst the piston portion 84 merges with the piston portion 83 via a shoulder 83a. An annular sliding seal 86 bears against the shoulder 83a and is sealingly slidable against the inner surface of the spool sleeve portion 76a. An oppositely directed annular sliding seal 87 surrounds the piston portion 82 and is sealingly slidable against the inner surface of the cylindrical insert portion 33a. The opposite side of the main piston portion 82 is formed integrally with a conical sealing head 88 via a neck portion 89 around which is located a sealing ring 90 designed to seat against the bevelled rim 65a.

The description of the structure of the valve component will be completed by defining the following annular spool valve chambers, namely, a spool valve chamber A intermediate the sealing rings 47a and 48a, a spool valve chamber B intermediate the sealing rings 48a and 49a, a spool valve chamber C intermediate the sealing rings 46a and 47a, a spool valve chamber D intermediate the sealing rings 49a and 50a, a spool valve chamber E intermediate the sealing rings 45a and 46a, a spool valve chamber F to the right of the sealing ring 50a and a spool valve chamber G to the left of the sealing ring 45a.

It is clear that in any position of the valve communication between adjacent chambers is only via the intervening sealing ring provided the latter is in fact open.

The valve unit 5 just described is hydraulically and mechanically coupled to a metering unit 10 (to be described below) by a coupling unit 95 (see FIGS. 7 and 8) which, as can be seen, is formed with a pair of venting apertures 96 and 97 which communicate respectively with the ports 31 and 32. There are furthermore provided a pair of axially directed ducts 98 and 99 which communicate with the ducts 29 and 30.

The coupling unit 95 is coupled to the metering unit 10 via a pair of coupling bungs 101 and 102 which are screw coupled through corresponding tapped apertures formed in a cylindrical casing 103 of the metering unit 10. The coupling bungs 101 and 102 are formed with apertured central recesses 104, 105 which respectively communicate with the ducts 98 and 99 on the one hand and, on the other hand, with opposite ends of the interior of the cylindrical casing 103 of the metering unit 10.

The cylindrical casing 103 is screw fitted, at one end thereof with an end cap 111 which is formed with a central boss 112 which extends into the cylindrical casing 103 and is formed with an outwardly directed flange 113 which bears via a suitable seal against the inner wall of the casing 103. On the lefthand side of the flange 113 is formed an annular recess 114 which communicates on the one hand with the duct 104 and, on the other hand, with a set of radial ducts 115 formed in the boss and which communicate with a central, axially directed cylindrical cavity 116 all formed in the boss 112.

A floating, cup-shaped piston 117 sealingly slides within the cylindrical casing 103 between a lefthand stop constituted by the flange 113 and a righthand stop constituted by an abutment member 118. The abutment member 118 is coupled to one end of a support tube 119 which passes sealingly out of a centrally apertured end cap 120 screw fitted to the righthand end of the cylindrical casing 103. The outside surface of the righthand end of the support tube 119 is screw coupled to a rectangular collar member 121 whilst the inner, tapped righthand end of the support tube 119 is screw coupled to an elongated screw rod 122.

The end cap 120 is formed integrally with a support frame 123 with respect to which the collar 121 is slidably keyed, thereby allowing for axial displacement of the collar member 121 but not allowing for rotation thereof. The frame member 123 is completed at the righthand end thereof by an end wall 124 through which extends the screw rod 122 coupled to a turning knob 125 and to an appropriate calibration scale 126. The rod 122 is axially fixed with respect to the end wall 124 by virtue of the flanged collar 124a which is clamped against the end wall 124 by a screw nut 124b.

Thus screw rotation of the turning knob 125 in one sense results in the axial displacement of the collar 121 and in consequence the support tube 119 and abutment member 118 in one direction whilst rotation of the knob 125 in the opposite sense results in the displacement of the abutment 118 in the opposite direction. In this way the location of the abutment 118 can be readily varied and this variation automatically resulting in the variation in the maximum stroke of the floating piston 117 within the cylindrical casing and therefore a corresponding variation of the amount of liquid metered by the metering unit.

Figure 9:
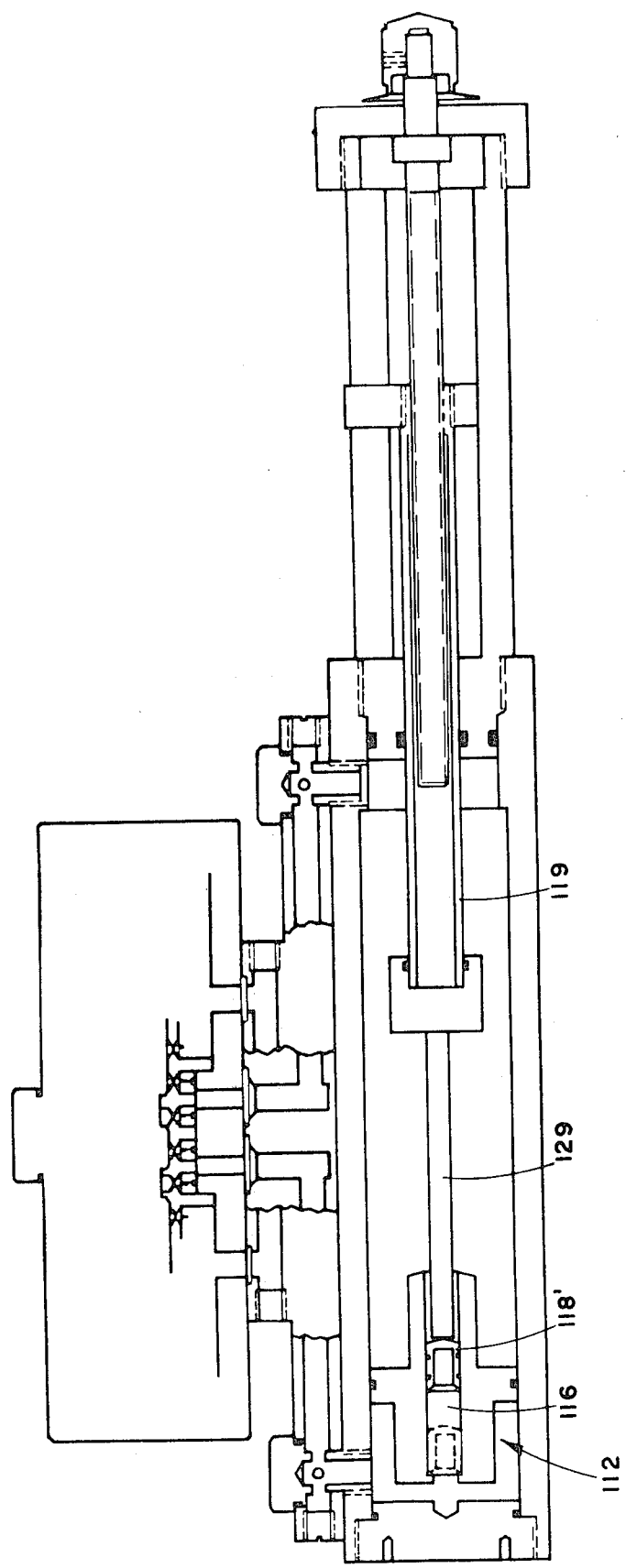
FIG. 9 is a longitudinally sectioned view of a modified form of metering unit in accordance with the present invention.

In a modification shown in FIG. 9 of the drawings and where it is desired to meter relatively small quantities of liquid to a high degree of accuracy the cylindrical cavity 116 formed in the boss 112 is utilize as the effective metering cylinder. In this case the large floating piston 117 is replaced by a small floating piston 117' and an extension abutment rod 129 is coupled to the support tube 119 so as to extend into the cavity 116. The stroke of the piston 117' being defined by the left-hand end wall of the cavity and by the position of the tip of the abutment rod 129. By varying the position of the latter (by rotating the knob 125) the amount of liquid metered can be varied.

The operation of the metering injector assembly 6 just described in ensuring the metered injection of a predetermined quantity of fertilizer liquid in a fixed predetermined amount of irrigation fluid flowing through a main irrigation pipe will now be described.

It will be understood that the coupling bung 15 is coupled to a liquid flow meter (the liquid flow meter 7 associated with the pipe 2 shown in FIG. 1 of the drawings) and an actuating hydraulic pulse is transmitted to the valve unit 5 via the coupling bung 15 every time a predetermined quantity of irrigation liquid flowing through the pipe 2 has been metered by the meter 7. It should also be understood that between the transmission of these hydraulic pulses the coupling bung 15 is effectively vented to the atmosphere. Furthermore the coupling bung 21 is coupled to the outlet of the hydraulically driven pump (constituting a source of fertilizer liquid under increased pressure) whilst the coupling bung 22 is coupled to the irrigation pipe for the injection thereinto of the metered quantity of fertilizer liquid.

Figure 2:
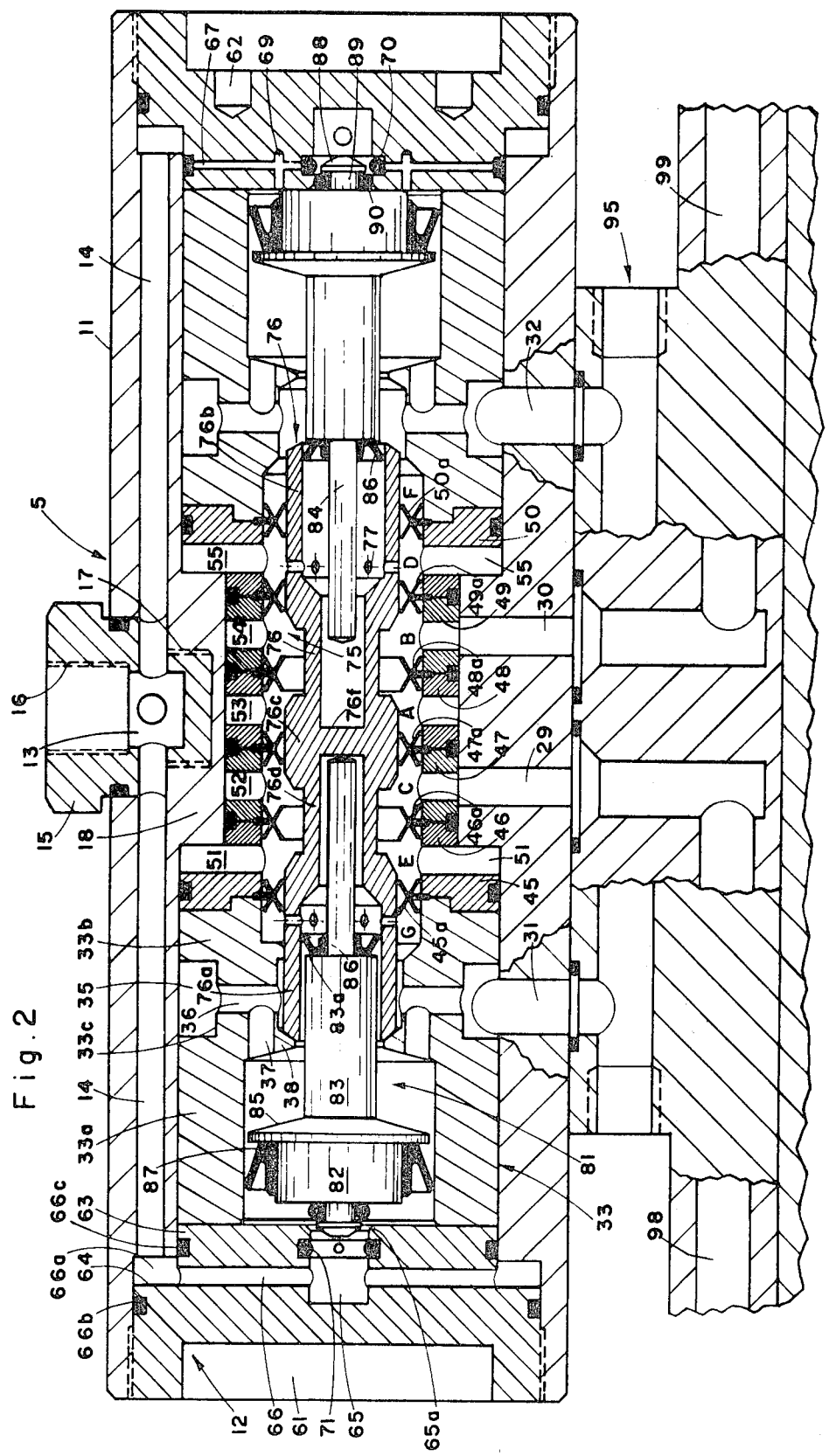
FIGS. 2, 3, 4 and 5 are longitudinal cross-sectional views of a valve unit of a metering injector assembly system in accordance with the present invention showing the valve in respectively successive stages of operation (FIG. 2 being shown on a relatively enlarged scale)

Referring to FIG. 2 of the drawings this figure shows the valve unit 5 immediately prior to the arrival of a hydraulic pulse with the coupling bung 15 and the ducts coupled thereto all effectively vented.

The irrigation liquid line pressure is transmitted, through the coupling bung 22, ducts 27 and 28 and 55 to the spool valve chamber D and from thence via the apertures 77 so as to act on the exposed sliding seal 86R of the piston portion 83R. Seeing that, in the absence of a hydraulic pulse, there is no counteracting force, the righthand piston is biased fully to its extreme righthand position and sealing is effected by the sealing ring 90R bearing on the seat formed by the bevelled rim 65aR.

As can be seen in FIG. 2 of the drawings the left-hand piston 81L is displaced by one or two millimeters to the right of its sealing position, this open, displaced position of the piston 81L having been achieved (in a manner to be described below) as a result of the action of the previous hydraulic pulse. It will also be understood that the regions adjacent the sliding seal 86L and the exposed conical surface 85L are vented to the atmosphere.

As seen in FIGS. 2 and 7 of the drawings, the outlets of the hydraulically driven pump (i.e. the pressurised source of fertilizer liquid) is connected via the duct 53, the open seal 48a, the duct 30 and the ducts 99 to the righthand end of the metering unit 10. The irrigation pipe on the other hand is coupled via the duct 51, the open seal 46a, the ducts 29 and 98 to the lefthand side of the metering unit 10. In consequence the righthand side of the metering unit, i.e. the portion thereof to the right of the floating piston 117 fills with the fertilizer liquid. It will be understood that the introduction of the fertilizer liquid under increased pressure into this right-hand portion of the metering unit 10 is initiated by the previous hydraulic control pulse and the resulting pressure differential established on either side of the floating piston 117 resulted in the displacement of the latter (from its broken line to its full line position) to the left and in the consequent ejection of the metered amount of fertilizer liquid from the left-hand side of the unit into the irrigation line.

When now a further predetermined quantity of water has passed in the irrigation pipe 2 and has been metered by the water flow meter 7 a further hydraulic pulse (which can be at the line pressure) is transmitted via the coupling bung 15 axial ducts 14 and radial ducts 66 so as to act, on the right-hand side, on the exposed conical surface of the sealing piston portion 88R and, on the left-hand side, on the exposed surface of the open sealing piston portion 82L and sealing ring 87L.

On the right-hand side seeing that the hydraulic pulse acts on a surface of the sealing piston 88R which is substantially less than the exposed surface of piston sealing ring 86R acted on in the opposite direction and as indicated above by the line pressure, no resultant displacement of the righthand piston 81R out of its sealing position will occur.

On the left-hand side however, the control hydraulic pulse pressure can be transmitted through the open rim 65aL so as to act on the fully exposed left-hand surface of the piston portion 82L and sealing ring 87L and, seeing that the oppositely directed surfaces of the piston 81L are all vented the action of the hydraulic pulse on the left-hand piston 81L is to displace the left-hand piston 81L towards the right. In view of the fact that the right-hand tip of the piston portion 84L bears on the central partition 76f of the spool sleeve 76 the displacement of the left-hand piston 81L to the right causes a corresponding displacement of the spool sleeve 76. The only resistance offered to this rightward movement of the spool cylinder arises out of the presence of the water in the right-hand region of the spool sleeve 76 and the rightward movement of the spool sleeve 76 results in the expulsion of this water through the apertures 77R and via the chamber D, ducts 55 back into the line 2. It will be seen however that with the rightward displacement of the spool sleeve 76 the apertures 77L leave the vented chamber G and enter the chamber E before the apertures 77R leave the chamber D and enter the vented chamber 7.

Figure 3:
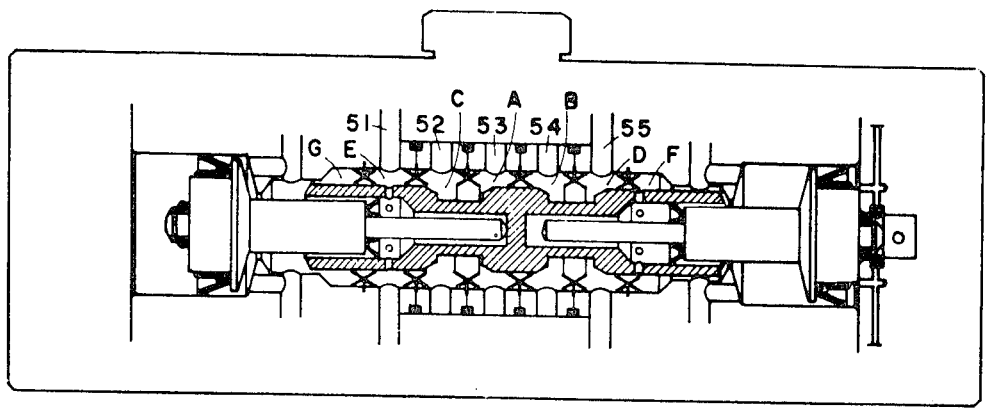

With the continued rightward movement of the spool sleeve 76 and, as can be seen in FIG. 3 of the drawings, the apertures 77L move into the region of the chamber E where they are now in communication with the irrigation line pressure which now acts on the sealing ring 86L in a leftward direction. In view of the fact however that the exposed surface offered by the sealing ring 86L is considerably less than the left-hand exposed surface of the piston portion 82L and sealing ring 87L acted on by the hydraulic pulse, this exposure of the apertures 77L to the irrigation line pressure does not effect on the disposition of the left-hand piston 81L.

On the other hand however, and as can be seen from FIG. 3 of the drawings, the continued rightward movement of the spool sleeve 76 results in the apertures 77R being exposed to the vented chamber F. As a consequence, the pressure exerted by the hydraulic pulse on the sealing piston portion 88R of the right-hand piston 81 in a leftward direction is no longer counterbalanced by any rightwardly directed pressure and the right-hand piston 81R moves to the left into the position shown in FIG. 4 of the drawings where the tip of the piston portion 84R abuts the central partition 76f of the spool sleeve 76. In this position the right-hand end of the sealing piston portion 88R is displaced some 1 to 2 mms out of its sealing position as shown in FIG. 4 of the drawings.

Figure 4:
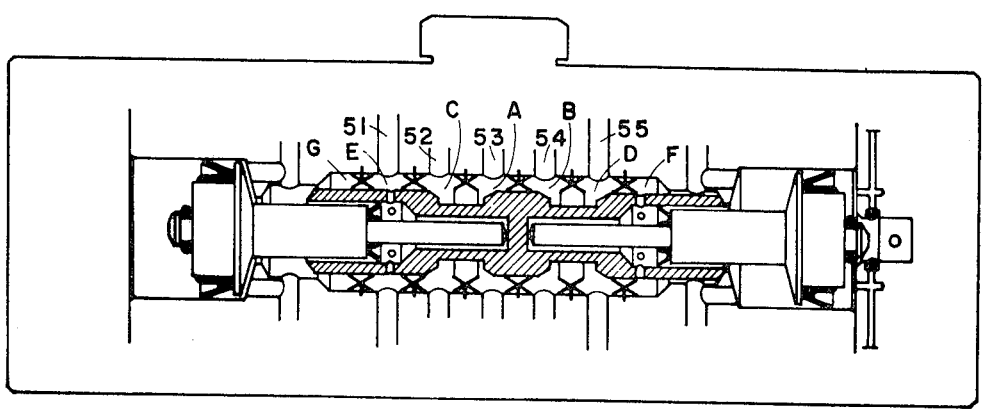

Thus, at this stage, and as shown in FIG. 4 of the drawings, with the hydraulic control pulse still operative the adjacent tips of the piston portions 84R and 84L are respectively pressed against the central partition 76f, the spool sleeve 76 has been displaced to the limit of its rightward stroke, the right-hand piston 81R has been displaced leftwardly some 1 to 2 mms away from its sealing position whilst the left-hand piston 81R has been displaced away from its sealing position.

Figure 5:
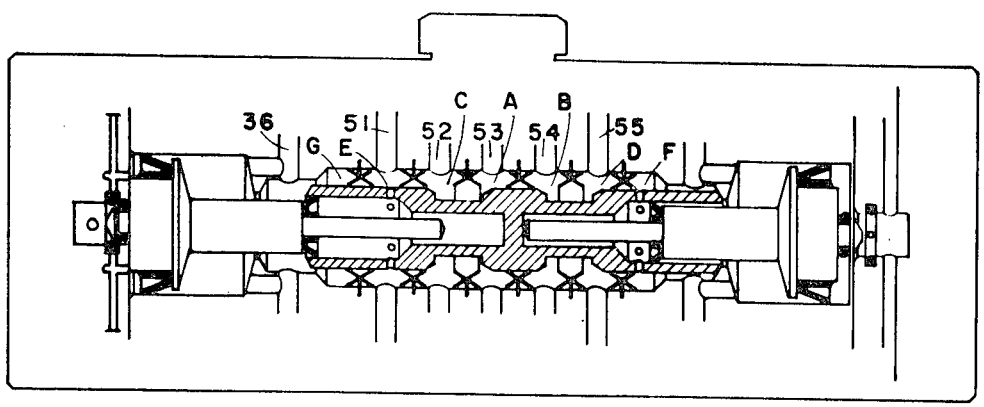

With the termination of the hydraulic control pulse and the consequent venting of the coupling bung 15 and the ducts coupled thereto, the irrigation line pressure in the chamber E is effective, via the apertures 77L on the sealing ring 86L of the piston portion 83L so as to bias the left-hand piston 81L leftwardly so that it is displaced into its closed position as shown in FIG. 5 of the drawings.

In this condition the left-hand end of the metering unit 10 communicates via ducts 115, 104, 98, 29, the open seal 47a and duct 53 with the increased pressurised fertilizer source whilst the right-hand side of the metering unit 10 communicates via ducts 105, 99, 30, open seal 49a and duct 55 with the irrigation line. As a consequence the floating piston 117 moves to the right to its broken line from its full-line position expelling the metered quantity of fertilizer in the right portion of the unit into the irrigation line (see FIG. 8 of the drawings).

The sealing rings 71 in the respective end caps 12 constitute non-return valves designed to allow for the escape of otherwise trapped liquid during the final sealing displacement of the pistons 81.

Thus as the piston portion 82 moves the final 1 or 2 mms into its sealing position the trapped water passes through the ducts 69, 67 forcing aside the sealing rings 71 and emerging via the ducts 66, etc. On the other hand, when water flows inwardly during the incidence of the hydraulic control pulse via the ducts 14, 16, the sealing ring 71 is sealingly forced against the ducts 67 preventing the outflow of water. In this way it is ensured that the hydraulic control pulse is only effective on the relatively small exposed area of the sealing piston portion 88 rather than on the much larger, entire area of the piston portion 82.

The liquid metering injector assembly just described can be used to ensure a substantially constant level of concentration of, for example, a fertilizer liquid in irrigation water flowing in a pipe. It will be realised that in order to ensure this relatively constant level the injected fertilizer liquid should be injected at relatively frequent intervals, and this in turn requires a relatively high repetition frequency for the hydraulic control pulses. Now this frequency is a direct function of the water flow rate in the irrigation pipe. Thus for example, in a small diameter pipe, x liters of water may have passed between two successive pulses, in a large diameter pipe a multiple of x liters of water will have passed in the same interval of time. If, as is the case, it is desired that the injection of the fertilizer liquid should always take place at more or less constant intervals of time, e.g. with inter-pulse time intervals of between 1.5 to 3 secs.; then, the quantity of the metered liquid should be determined in accordance with the flow rate in the irrigation pipe. Thus with a more or less constant frequency rate for the hydraulic control pulses a substantially higher metered quantity of fertilization liquid would have to be injected, with each control pulse with a large diameter irrigation pipe than would be the case with a small diameter pipe. It is to provide for such an eventuality that the variable metering facility of the metering unit is available. Thus, as previously indicated, the metered quantity can be predetermined by adjustment of the location of the abutment 118.

The valve unit 5 of the assembly 1 is of particular advantageous construction seeing that the reciprocating movement of the spool valve 75 necessary to ensure the successive and alternate coupling of the ends of the metering unit to the irrigation pipe on the one hand and the hydraulically driven pump on the other hand is achieved by the feeding of the hydraulic control pulses to a single central position of the valve rather than to both ends thereof.

While the principles of the invention have been described above in connection with specific apparatus and applications, it is to be understood that this description is made by way of example only and not as a limitation of the scope of the invention.

a displacing portion on each of said pistons on the end adjacent said partition and adapted upon displacement of said stepped piston to displaceably abut said partition to move said spool sleeve means responsive to successive pulses.

I claim:

1. A liquid metering injector assembly for injecting metered quantities of a first liquid into respective metered quantities of a second liquid comprising a metering cylinder, metering ports formed at either end of said metering cylinder, a metering piston displaceable in said metering cylinder;

a valve unit having a valve inlet for coupling to a pressurized source of said first liquid; means for coupling the valve to a hydraulic pulse source; a valve outlet for coupling to a source of said second liquid; a pair of communication valve ports of said valve unit respectively communicating with said metering ports and selectively communicatable with said valve inlet and outlet;

a spool valve comprising a tubular spool sleeve which is axially slidable in a cylindrical casing of said valve unit with respect to a succession of axially spaced apart annular sealing rings mounted with respect to said cylindrical casing and defining with said spool sleeve a plurality of chambers communicating with said valve inlet and outlet and said valve communication ports;

said sleeve having successive axial portions of differing diameters such that with axial displacement of said sleeve differing adjacent chambers are placed in communication;

the outermost annular sealing rings defining with the spool sleeve, chambers which are continually vented;

said spool sleeve formed with a central dividing partition, the sleeve walls on either side of said partition being apertured whereby each sleeve interior on either side of the partition is successively in communication with the vented chamber and with the chamber in communication with said valve outlet;

a pair of stepped pistons provided on either side of said partition;

each stepped piston having successively a sealing portion adjacent a pulse inlet communicating with said valve inlet;

a main portion, sealingly slidable within said cylindrical casing;

an adjacent portion sealingly slidable in said tubular sleeve; and a displacing portion having a free end adjacent said partition and adapted, upon displacement of said stepped piston displaceably to abut said partition.

2. An assembly according to claim 1 wherein the regions of said cylindrical casing adjacent said pulse inlets communicate with said valve inlet via non-return valves.

3. An assembly according to claim 1 wherein said valve inlet communicates with said pulse inlets via ducts formed in said cylindrical casing and in end caps thereof.

4. An assembly according to claim 1 wherein said metering cylinder is provided with an axially adjustable stop member whose axial position determines the stroke of said metering piston and consequently the quantity of the first liquid to be metered.

5. An assembly according to claim 4 wherein said stop member is screw adjustable from outside said metering cylinder by the calibrated rotation of a turning knob coupled to said stop member by a screw member which passes through a fixed support.

6. An assembly according to claim 1 wherein said metering cylinder includes a fractional cylinder located therein, the ends of said fractional cylinder respectively communicating with said metering ports, wherein said stop member extends into said fractional cylinder, and wherein said metering piston is located in said fractional cylinder.

7. A hydraulically controlled valve unit, said valve unit comprising:

a valve inlet port for coupling said valve unit to a first liquid supply, a hydraulic pulse coupling means for coupling said valve unit to a hydraulic pulse source, a valve outlet port for coupling said valve unit to a second liquid supply, communication port means for coupling said valve unit to a third liquid supply, said communication port means comprising first and second metering ports, displaceable spool valve means displaced responsive to each of said hydraulic pulses between first and second positions, said spool valve means in said first position enabling communication between said inlet port and said first metering port and between said outlet port and said second metering port, said spool valve means in said second position enabling communication between said inlet port and said second metering port and between said outlet port and said first metering port, said spool valve means remaining in the position to which displaced until receiving a subsequent hydraulic pulse, said spool valve means having a hollow interior to form spool sleeve means, said spool sleeve means slideable within a cylindrical casing and being formed with a dividing partition, annular sealing rings defining a plurality of side by side spool chambers with the outside of said spool sleeve means and said cylindrical casing, means venting the outermost of said spool chambers, means enabling the penultimate outer chambers to communicate with said valve outlet port, means enabling the next inner chambers to communicate with said communication port means and means enabling a central chamber of said plurality of chambers to communicate with said valve inlet port means, the spool sleeve means being apertured on either side of said partition for enabling communication between the interior of the spool sleeve means on each side of the partition successively with said vented outer chambers and said penultimate outer chambers in communication with said valve outlet port means, and wherein a pair of stepped pistons are provided on either side of said partition, each stepped piston having successively a sealing portion adjacent a pulse inlet duct and a main portion within said spool sleeve means thereby in communication successively with the outer chambers and the penultimate outer chambers, whereby each of said pistons is displaced responsive to successive ones of said pulses, a displacing portion on each of said pistons on the end adjacent said partition and adapted upon displacement of said stepped piston to displaceably abut said partition to move said spool sleeve means responsive to successive pulses.

8. A liquid metering injector assembly for injecting selectively variable metered quantities of a fertilizing liquid into metered quantities of water comprising:

a metering cylinder, a metering piston displaceable in said metering cylinder, first and second metering ports each formed on opposite sides of said metering cylinder, means for varying the stroke length of said metering piston to thereby vary the metered amounts displaced by said metering piston, a hydraulically operated valve unit having a valve inlet, means for coupling said valve inlet means to a presurized source of said fertilizer liquid, a hydraulic pressure pulse source operated to provide hydraulic pressure pulses as a function of the passage of a fixed amount of water to thereby meter fixed amounts of flowing water, said hydraulic pressure pulses acting upon said valve to actuate said valve unit, a valve outlet on said valve unit for coupling said valve to a pipe carrying said flowing water, first and second valve communication ports on said valve unit respectively communicating with said first and second metering ports, said valve unit comprising a displaceable spool valve, said spool valve being displaced by said hydraulic pressure pulses between a first position wherein said inlet is in communication with said first metering port and said outlet is in communication with said second metering port and a second position wherein the inlet is in communication with the second metering port and the outlet is in communication with the first metering port, means for displacing said spool valve between said first and second positions responsive to the receipt of said hydraulic pressure pulses, and means for maintaining said spool valve in the last displaced position until the receipt of a further one of said hydraulic pressure pulses whereby said valve has two stable outlet positions, one connecting the inlet to the first communication port and the outlet to the second communication port and a second stable position wherein said inlet is connected to the second communication port and the outlet is connected to the first communication port for successively filling the cylinder on one side of said piston with fertilizer while forcing the fertilizer on the other side of said piston into said pipe carrying the water, responsive to the pressure pulses.

9. The assembly of claim 8 wherein said valve unit comprises first and second piston units oppositely disposed at either side of said displaceable spool valve, said first and second piston units each having inner and outer sides successively and oppositely exposed to said pressure pulses and vented to atmosphere whereby said piston means forces said spool valve unit to move responsive to said successive pulses between said first and second positions.

10. A hydraulically controlled valve unit, said valve unit comprising:

valve inlet means for coupling said valve unit to a first pipe, hydraulic pressure pulse coupling means for coupling said valve unit to a source of hydraulic pressure pulses, said hydraulic pressure pulses acting upon said valve unit to actuate said valve unit, said pulse coupling means including only a single port, valve outlet means for coupling said valve unit to a second pipe, first and second communication port means, said valve unit comprising displaceable spool valve means, said spool valve means having a first position wherein said valve inlet means is in communication with said first communication port means and said valve outlet means is in communication with said second communication port means and a second stable position wherein said valve inlet means is in communication with said second communication port means and said valve outlet means is in communication with said first communication port means, and hydraulic means responsive to said hydraulic pressure pulses and acting upon said spool for moving said spool between said first and second positions per pressure pulse.

11. The valve unit of claim 10, wherein means are provided for applying the pressure pulse to one side of said spool means while the other side of said spool means is vented thereby forcing said spool means to move towards the vented side, and means responsive to said spool means moving towards the vented side for enabling the next pressure pulse to be applied to the other side of said spool means and the one side of said spool means to be vented whereby when the next pulse is received the spool means moves in the opposite direction.

* * * * *